(12) United States Patent
Huang et al.

(10) Patent No.: US 9,946,611 B2
(45) Date of Patent: Apr. 17, 2018

(54) METHOD, APPARATUS AND SYSTEM FOR MATCHING DEVICES

(71) Applicant: Alcatel Lucent, Boulogne-Billancourt (FR)

(72) Inventors: Weihua Huang, Shanghai (CN); Bin Zhao, Shanghai (CN); Yujian Wang, Shanghai (CN); Zhiji Zhang, Shanghai (CN); Yongming Gai, Shanghai (CN); Shan Jin, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 226 days.

(21) Appl. No.: 14/778,332

(22) PCT Filed: Mar. 20, 2014

(86) PCT No.: PCT/IB2014/000564
§ 371 (c)(1),
(2) Date: Sep. 18, 2015

(87) PCT Pub. No.: WO2014/162199
PCT Pub. Date: Oct. 9, 2014

(65) Prior Publication Data
US 2016/0285687 A1     Sep. 29, 2016

(30) Foreign Application Priority Data

Mar. 31, 2013 (CN) .......................... 2013 1 0110402

(51) Int. Cl.
*G06F 11/00* (2006.01)
*G06F 11/20* (2006.01)
(Continued)

(52) U.S. Cl.
CPC ...... *G06F 11/2005* (2013.01); *G06F 11/2033* (2013.01); *H04L 41/0866* (2013.01); *H04L 67/303* (2013.01)

(58) Field of Classification Search
CPC ............ G06F 11/2033; G06F 11/0709; G06F 11/2005; G06F 11/202; G06F 11/2023; H04F 41/0866; H04L 67/303
(Continued)

(56) References Cited

U.S. PATENT DOCUMENTS

2006/0218291 A1    9/2006  Zhu et al.
2007/0150079 A1*   6/2007  Blevins .............. G05B 23/0251
                                                        700/41
(Continued)

FOREIGN PATENT DOCUMENTS

CN       102710515 A    10/2012
JP       2007018231 A    1/2007
(Continued)

OTHER PUBLICATIONS

International Search Report PCT/ISA/210 for International Application No. PCT/IB2014/000564 dated Aug. 4, 2014.
(Continued)

*Primary Examiner* — Joseph D Manoskey
(74) *Attorney, Agent, or Firm* — Harness, Dickey & Pierce, P.L.C.

(57) ABSTRACT

In one embodiment, the method includes obtaining device-related information corresponding to a plurality of devices from the device manager, selecting, for each first device, a second device matching each first device from among the at least one second device based on device-related information of the each device; determining corresponding device matching information based on the second devices matching the each first device, and sending the device matching information to the at least one second controller; wherein the device matching information includes one or more pairs of matching first device and second device.

10 Claims, 3 Drawing Sheets

(51) Int. Cl.
*H04L 29/08* (2006.01)
*H04L 12/24* (2006.01)

(58) Field of Classification Search
USPC .......................................... 714/47.3, 4.1, 4.11
See application file for complete search history.

(56) References Cited

U.S. PATENT DOCUMENTS

| | | | |
|---|---|---|---|
| 2008/0188972 A1* | 8/2008 | Miller | G05B 19/4184 700/110 |
| 2011/0302140 A1* | 12/2011 | Gokhale | G06F 11/1471 707/645 |
| 2012/0040615 A1 | 2/2012 | Auriffeille et al. | |
| 2012/0282922 A1 | 11/2012 | Fodor et al. | |

FOREIGN PATENT DOCUMENTS

| | | | |
|---|---|---|---|
| JP | 2007286893 A | 11/2007 | |
| JP | 2012221330 A | 11/2012 | |
| WO | WO-08056000 A2 | 5/2008 | |
| WO | WO-11087408 A1 | 7/2011 | |

OTHER PUBLICATIONS

Hideaki Ishii, Networked control: new directions in control with shared communication, Journal of the Society of Instrument and Control Engineers, vol. 47, No. 8, Aug. 10, 2008.

\* cited by examiner

METHOD, APPARATUS AND SYSTEM FOR MATCHING DEVICES

CROSS-REFERENCE TO RELATED APPLICATIONS

This application is a national phase under 35 U.S.C. § 371 of PCT International Application No. PCT/182014/000564 which has an International filing date of Mar. 20, 2014, the entire contents of each of which are hereby incorporated herein by reference.

FIELD OF THE INVENTION

The present invention relates to the field of communication technologies, and more specifically, to a method, apparatus, and system for matching devices.

BACKGROUND OF THE INVENTION

A NCS (Networked Control System) is a feedback control system formed by a digital communication network and having control loops. It may be applied to technologies such as remote operation, industrial control, robot, and automated transportation tool control. However, the M2M network (or called Machine to Machine) that is currently developing rapidly provides a faster connection for a considerable number of sensors and actuators in the NCS, such that the NCS can be adapted to the Internet, not being limited to the traditional local area network any more.

However, in this case, the difficulty facing the traditional NCS control loops lies in how to handle the frequently occurring, highly mobilized, and dynamic network topological structure in the M2M network so as to overcome the constraints of the traditional NCS system.

In a hierarchical NCS, the local area controller is used for receiving sensor signals and sending simple commands; a higher-layer controller is connected to a plurality of NCSs via Internet or Ethernet and receives all information about connection to the NCS. It has a wider view angle on the logical layer and therefore may execute advanced businesses such as planning and scheduling, etc. However, such a structure has the following problems:

1. In the current NCS implementation, the connection between sensors, actuators, and control units is fixed, such that its mobile performance is relatively poor. However, in the wireless sensor and actuator network, a mobile device node may access or exit at any time; therefore, it is a dynamic network topological structure; the current NCS system cannot pre-configure or maintain a corresponding control loops.

2. The current NCS system basically does not have an error-allowance performance. If any means in the control loops, particularly a sensor or actuator, fails, it will directly damage the whole control loops.

SUMMARY OF THE INVENTION

An objective of the present invention is to provide a method, apparatus and system for matching devices.

According to one aspect of the present invention, there is provided a method implemented by a first controller for matching devices, the said first controller is connected to a device manager and at least one second controller, wherein said method comprises the following steps:

a. obtaining device-related information corresponding to a plurality of devices from the said device manager, wherein the said plurality of devices comprise at least one first device and at least one second device;

b. selecting, for each first device, a second device matching the said each first device from among the said at least one second device based on device-related information of the each device;

c. determining corresponding device matching information based on the second devices matching the each first device, and sending the said device matching information to the at least one second controller; wherein the device matching information comprises one or more pairs of matching first device and second device.

According to one aspect of the present invention, there is provided a method implemented by a second controller for determining a control loop, the said second controller is connected to a first controller, wherein the said method comprises the following steps:

receiving device matching information from the said first controller to form a control loop based on the said device matching information; wherein the said device matching information comprises one or more pairs of mutually matching first device and second device.

According to one aspect of the present invention, there is provided a method implemented by a device manager for providing device-related information, wherein the said device manager is connected to a first controller, and the said device manager is connected to a plurality of devices based on a predetermined protocol, the said plurality of devices comprising at least one first device and at least one second device; wherein the method comprises the following steps:

obtaining device-related information of each device;

sending the obtained device-related information of the said each device to the said first controller.

According to one aspect of the present invention, there is further provided a first controller, the said first controller is connected to a device manager and at least one second controller, wherein the said first controller comprises:

a first obtaining module configured to obtain device-related information corresponding to a plurality of devices from the said device manager, wherein the said plurality of devices comprise at least one first device and at least one second device;

a selecting module configured to select, for each first device, a second device matching the said each first device from among the said at least one second device based on device-related information of the each device;

a first sending module configured to determine corresponding device matching information based on the second device matching the each first device, and sending the device matching information to the at least one second controller; wherein the device matching information comprises one or more pairs of matching first device and second device.

According to one aspect of the present invention, there is provided a second controller, the said second controller is connected to a first controller, wherein the said second controller comprises:

a first receiving module configured to receive device matching information from the said first controller to form a control loop based on the said device matching information; wherein the said device matching information comprises one or more pairs of matching first device and second device.

According to one aspect of the present invention, there is provided a device manager, wherein the said device manager is connected to a first controller, and the said device manager is connected to a plurality of devices based on a predetermined protocol, the said plurality of devices comprising at least one first device and at least one second device; wherein the device manager comprises:

a second obtaining module configured to obtain device-related information of each device;

a third sending module configured to send the obtained device-related information of the said each device to the said first controller.

According to one aspect of the present invention, there is provided a hierarchical networked control system, wherein the said hierarchical networked control system comprises the first controller, the second controller, the device manager, and at least one first device and at least one second device.

Compared with the prior art, the present invention has the following advantages: the first controller may promptly know access and exit of each device in the network and correspondingly adjust each control loops, such that the networked control system has a higher flexibility and can better handle the current dynamic network topological structure; additionally, since it can provide a new control loops when fault occurs to a device so as to perform an approximate function, the whole networked control system has a higher error-allowance performance.

BRIEF DESCRIPTION OF THE SEVERAL VIEWS OF THE DRAWINGS

Through reading the following detailed depiction on the non-limiting embodiments with reference to the accompanying drawings, the other features, objectives, and advantages of the present invention will become more apparent.

Same or like reference numerals in the accompanying drawings indicate the same or corresponding components.

DETAILED DESCRIPTION OF THE INVENTION

Hereinafter, the present invention will be further described in detail with reference to the accompanying drawings.

Figure 1:
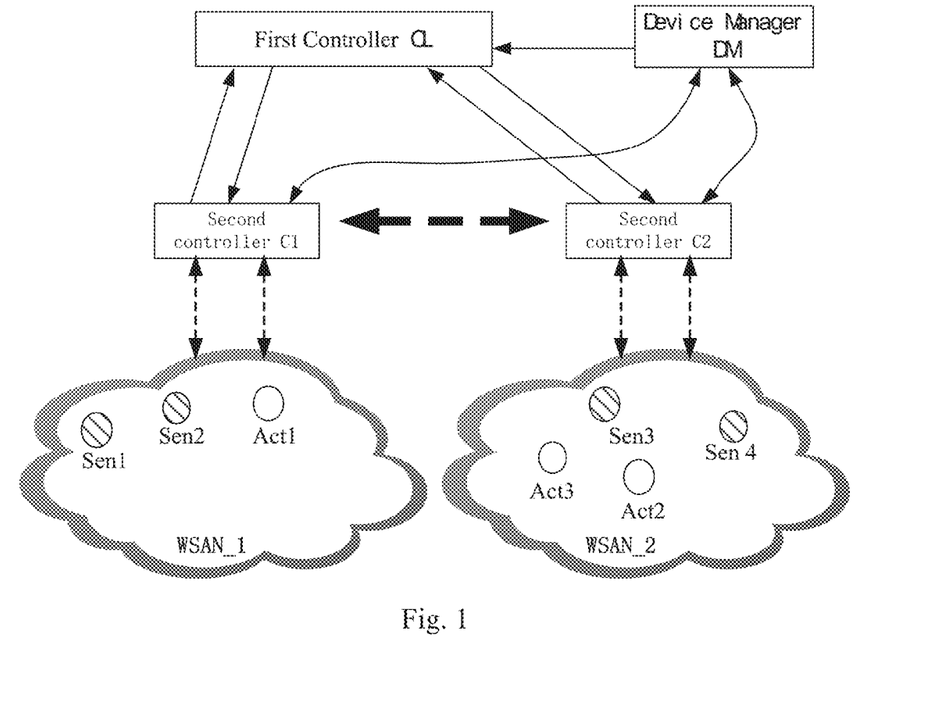
FIG. 1 schematically illustrates a hierarchical networked control system for matching devices according to one embodiment of the present invention.

FIG. 1 schematically illustrates a hierarchical networked control system for matching devices according to one embodiment of the present invention.

In FIG. 1, the hierarchical networked control system according to the present invention comprises a device manager, at least one first controller, at least one second controller, and at least one first device and at least one second device.

Wherein, the device manager is connected to a plurality of devices based on a predetermined protocol, said plurality of devices comprising at least one first device and at least one second device. The device manager may be connected to each device through a plurality of manners: for example, connected to each device based on a device management gateway; for another example, the device manager is connected to each device through the first controller and/or the second controller, etc. Said first controller is connected to the device manager and at least one second controller.

Herein, when the first device is a sensor, the second devices is an actuator; vice versa, when the second devices is a sensor, the first device is an actuator.

Herein, the predetermined protocol includes various kinds of protocols that may be applied to a M2M (Machine to Machine) system; preferably, the predetermined protocol includes an OMA DM (Open Mobile Alliance Device Management) protocol.

Here, the controller according to the present invention comprises a processing module, a breaker module, and a communication module. Here, the processing module includes an electronic device automatically performing numerical value calculation and information processing according to a pre-set or pre-stored instruction, and its hardware includes, but not limited to, a microprocessor, an application-specific integrated circuit (ASIC), a programmable gate array (FPGA), a digital processor (DSP), or an embedded device, etc. The breaker module is used for controlling connection and disconnection of a line based on instructions from the processor module; the communication module is used for transmitting and receiving data based on a predetermined communication protocol.

Figure 2:
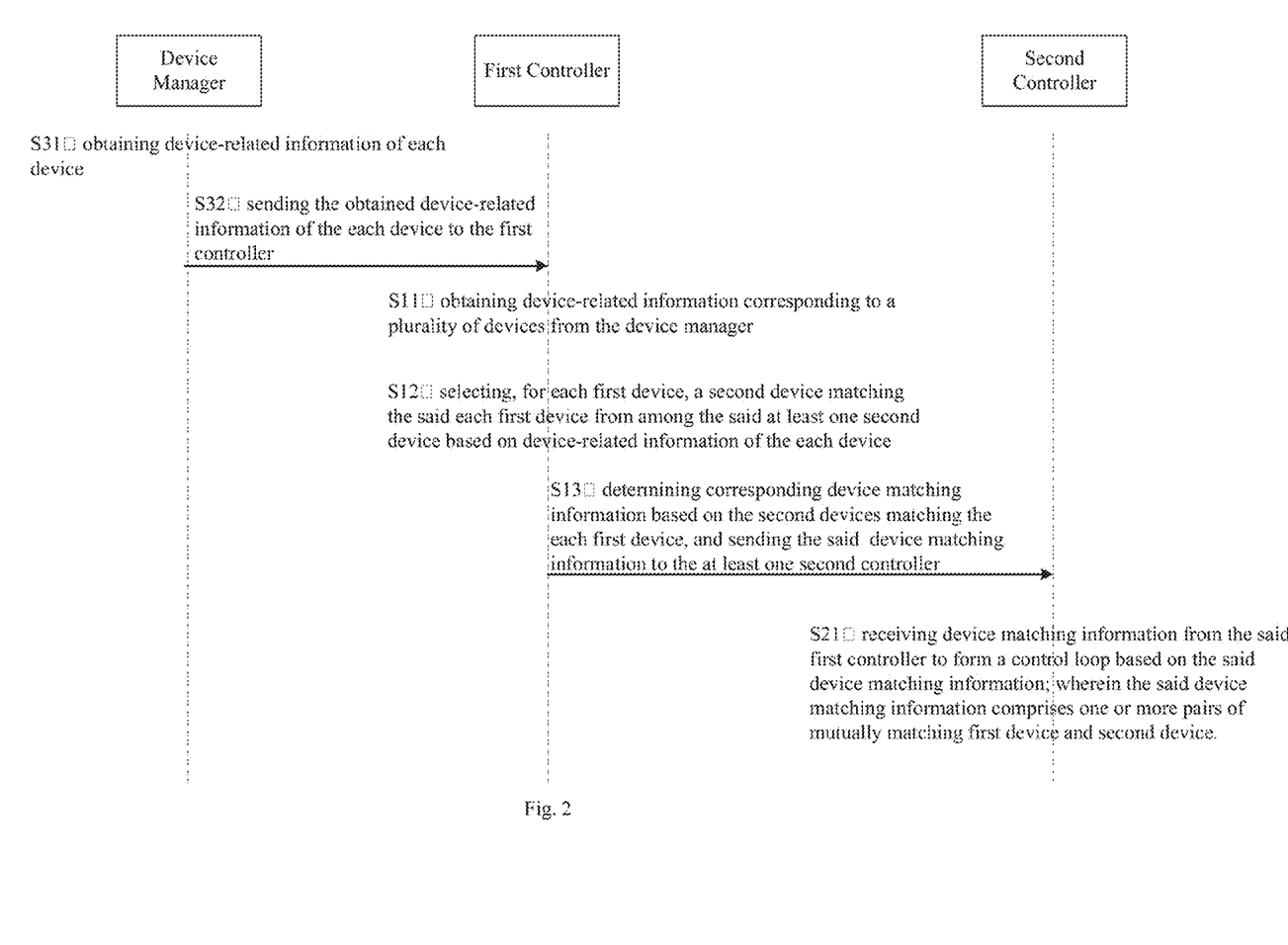
FIG. 2 schematically shows a flowchart of a method for matching identification according to the present invention.

Here, FIG. 2 schematically shows a flowchart of a method for matching identification according to the present invention. The method according to the present invention comprises step S11, step S12, and step S13 executed by a first controller, and step S21 executed by a second controller, and step S31 and step S32 executed by a device manager.

With reference to FIG. 2, in step S31, the device manager obtains device-related information of each device. Here, the said each device comprises at least one first device and at least one second device.

Specifically, the device manager obtains device-related information from each device based on an information transmission interface corresponding to a predetermined protocol.

Here, the device-related information includes, but not limited to, at least any one of the following:

1) device function information, e.g., sensors may be categorized into types of sensing temperature, sensing illumination intensity, sensing humid according to the information type received by the devices; for another example, the actuators may be categorized into operations for alarm, for enhancing sensor signals, and for weakening sensor signals, etc., according to the types of the operations performed by the devices.

2) device location information: preferably, the device location information includes relative location information with respect to other device, e.g., distance information with respect to other device, etc.

3) device performance information, e.g., remaining power information of the device, load information of the device, etc.

According to a first example of the present invention, with reference to FIG. 1, the hierarchical networked control system according to the present invention comprises a first controller CL, a device manager DM, two second controllers C1 and C2 belonging to wireless sensing and actuation networks WSAN-1 and WSAN-2, respectively, wherein WSAN_1 includes two sensors Sen 1 and Sen 2 and one actuator Act1, the WSAN_2 includes two sensors Sen 3 and Sen 4 and two actuators Act 2 and Act3. Here, the device manager DM is connected to each sensor and actuator through the second controllers C1 and C2 based on a predetermined OMA DM protocol, and obtains device-related information of the sensors Sen 1-Sen 4 and actuators Act 1 to Act 3 through a predetermined data transmitting interface defined by the OMA DM protocol.

Next, in step S32, the device manager sends the obtained device-related information of the each device to the first controller.

Preferably, according to the method of the present invention, the device manager further performs step S33 (not shown).

In step S33, when a predetermined update condition is satisfied, the device manager updates the obtained device-related information.

Here, the predetermined update condition includes, but not limited to, at least any one of the following:

1) predetermined time condition: for example, performing update upon arrival at a predetermined time point; for another example, performing the update operation with a predetermined internal from the last update operation.

2) predetermined event condition: i.e., when a predetermined event occurs, update the obtained device-related information. For example, when it is predetermined to receive fault report information from a device, perform the update; for another example, when detect a fault to a device based on heartbeat detection.

Specifically, the method for the device manager to obtain the update information is identical or similar to the method of obtaining the device related-information in above step S31, which will not be detailed here.

More preferably, the device manager further performs step S32 after step S33 so as to send the updated device related-information to the first controller.

Next, in step S11, the first controller obtains device-related information corresponding to a plurality of devices from the device manager.

Specifically, the manner for the first controller to obtain device-related information corresponding to a plurality of devices from the device manager includes, but not limited to, any one of the following:

1) voluntarily sending inquiry information to the device manager so as to obtain the device-related information as fed back from the device manager;

2) receiving the device-related information sent by the device manager.

Next, in step S12, the first controller selects, each first device, a second device matching the said each first device from among the said at least one second device based on device-related information of the each device.

Specifically, the first controller obtains matching information between each first device and each second device according to a predetermined matching rule, and determines second device(s) that best matches each first device based on the matching information.

Here, the matching information includes, but not limited to, any one of the following forms:

1) matching value, e.g., calculate a value of a matching degrees between the first device and the second devices based on the device-related information in accordance with a predetermined matching rule, and select second devices with the highest matching degrees for the first device based on the matching value.

2) matching level, e.g., calculate a matching level between the first device and the second devices based on the device-related information in accordance with a predetermined matching rule, and select second devices with the highest matching degrees for the first device based on the matching level.

Here, those skilled in the art may determine the predetermined matching rule for determining the matching information between the first device and the second devices according to the actual condition and need, which will not be detailed here.

Continue illustration of the above first example. The first controller determines an actuator that has a highest function matching degrees, a nearest distance, and a best current performance for each sensor based on the device-related information of each sensor Sen 1-Sen 4 and actuator Act 1-Act 3 in accordance with a predetermined matching rule, and obtains the matching degrees between each sensor and each actuator, as shown in Table 1 below.

TABLE 1

| Sensors | Actuators | Matching degrees |
|---------|-----------|------------------|
| Sen1    | Act1      | 1                |
|         | Act2      | 0.9              |
|         | Act3      | 0                |
| Sen2    | Act1      | 0.55             |
|         | Act2      | 0.6              |
|         | Act3      | 0                |
| Sen3    | Act1      | 0                |
|         | Act2      | 0                |
|         | Act3      | 1                |
| Sen4    | Act1      | 0                |
|         | Act2      | 0                |
|         | Act3      | 0                |

Next, in step S13, the first controller determines corresponding device matching information based on the second devices matching the each first device, and sends the said device matching information to the at least one second controller.

Here, the device matching information comprises one or more pairs of matching first device and second device.

Specifically, the first controller sends the information about the second device(s) determined in step s12 that best matches each first device as the device matching information to at least one second controller that is connected to the first controller.

Preferably, the step S13 further comprises step S131 (not shown) and step S132 (not shown).

In step S131, the first controller determines control loops between each first device and each second device that mutually matching based on line configuration information of each device and the selected second devices matching each first device.

Here, the line configuration information includes, but not limited to, line connection configuration for each device to receive data and line connection configuration for the devices to upload data.

Specifically, the first controller determines control loops between each paired first device and second device based on the line configuration information of each device and the determined paired information of each first device and second device.

Continue illustration of the above first example. The first controller CL determines that Sen 1 and Act 1, and Sen 3 and Act 3 are two groups of devices with a highest mutual matching degree based on the matching results obtained in step s12 as shown in Table 1, and the first controller CL determines that the control loop corresponding to the pair of Sen 1 and Act 1 is "Sen 1-CL-Act 1," the control loop corresponding to the pair of Sen 3 and Act 3 is "Sen 3-C2-Act 2," and sends the information about the two determined pairs and their corresponding control loops as the device matching information to the second controller C1 and the second controller C2.

Next, in step S132, the first controller sends the information about the selected second devices matching each first device and the determined control loops between the each first device and each second device that mutually matching as the device matching information to the second controller.

In step S21, the second controller receives the device matching information from the first controller to form a control loops based on the device matching information.

Preferably, the device matching information includes information about the control loops corresponding to each pair of devices.

Here, the second controller determines a closed state of each line switch under its control based on the received information about the control loop, so as to form control loops between each first device and each second device that mutually matching in the device matching information.

Continue illustration of the above first example. The second controller C1, after receiving the device matching information from the first controller CL, determines to connect the lines of Sen 1 and Act 1 via the second controller C1 based on the control loop information corresponding to the pair of Sen 1 and Act 1 in the device matching information, to form a control loop Sen 1-C1-Act 1; correspondingly, the second controller C2, after receiving the device matching information sent from the first controller CL, determines to connect the lines of Sen 3 and Act 3 via the second controller C2 according to the control loop information corresponding to the pair of Sen 3 and Act 3, to form a control loop Sen 3-C2-Act 3.

According to one preferred embodiment of the present invention, the method according to the present invention further comprises step S14 (not shown) and step S15 (not shown) performed by the first controller.

In step S14, when a predetermined trigger condition is satisfied, the first controller updates the device matching information.

Here, the predetermined trigger condition includes, but not limited to, at least any one of the following:

1) predetermined time trigger condition, for example, trigger at predetermined time point; for another example, trigger at each predetermined time period, etc.;

2) predetermined event trigger, for example, when receiving the information fed back by the second controller, trigger the update operation; for another example, when receiving a prompt from the device manager that the device-related information changes, trigger the update operation.

Specifically, the manner in which the first controller updates the device matching information includes, but not limited to, any one of the following:

1) determining new device matching information by repetitively performing the above step S11 and step S12;

2) when the first controller has saved the matching information between each device as obtained in step S12, updating the device matching information based on the saved matching information.

Next, in step S15, the first controller sends update information to the at least one second controller based on the updated device matching relationship, the update information being used for indicating each second controller to update the device matching information of their own.

Here, the update information includes any one of the following:

1) updated device matching information;

2) update indication information, e.g., the update indication information comprises: changing a pair in the current device matching information into information of another pair, etc.

Preferably, according to the manner of the present embodiment, the predetermined update trigger condition includes receiving device fault information from the second controller, the device fault information being used for indicating fault of one or more devices, wherein step S14 performed by the first controller further comprises step S141 (not shown), the second controller further performs step S22 (not shown), step S23 (not shown), and step S24 (not shown).

In step S22, when the second controller detects fault of one or more devices, it sends device fault information to the first controller. Here, the device fault information is used for indicating that one or more devices fail.

Preferably, the device fault information includes device identification information for identifying a device.

Continue illustration of the above first example. When the second controller C1 detects fault of the actuator Act 1, it sends device identification information of the actuator Act 1 to the first controller, so as to prompt the first controller that the actuator Act 1 has a fault.

Next, at step S141, the first controller updates the device matching information based on the device fault information.

Specifically, the first controller determines, based on a device corresponding to the device fault information, another device matching the device according to the current device matching information, and re-determines an other device matching the another device so as to update the device matching information. Here, when the another device is the first device, the other device is the second device; vice versa, when the another device is the second device, the other device is the first device.

Here, suppose the another device is the first device, then the manner of re-determining the other second device matching the first device includes, but not limited to any one of the following:

1) according to the device-related information of the first device, compare with the device-related information of every other available second device to obtain a second device matching the first device, thereby updating the device matching information;

2) when the first controller has saved the matching information between the first device and every other second device as obtained in step S12, selecting a second device best matching the first device from among every second device currently available based on the matching information so as to update the device matching information.

Preferably, when the device matching information further includes information about control loops of each paired devices, after determining a new device pair, the first controller further determines a control loop corresponding to the new device pair so as to obtain the updated device matching information.

Continue illustration of the above first example. When the first controller CL receives the device fault information including the device identification information of Act 1 from the second controller C1, the first controller CL determines that the sensor matching Act 1 is Sen 1 based on the current device matching information; next, the first controller determines, based on the matching degrees between Sen1 and every other actuator as obtained in step S12, that the actuator that best matches the sensor Sen 1 from among the available actuators is the actuator Act 2, and determines that the current new device matching information includes pairing of Sen 1 and Act 2, and pairing of Sen 3 and Act 3; moreover, the first controller CL determines, based on the line configuration information between Sen 1 and Act 2, that Sen 1 and Act 2 may be connected through the first controller CL and the second controller C2.

Next, the first controller sends the update information to the second controller by performing step S15.

Next, in step S23, the second controller receives the update information from the first controller.

Next, in step S24, the second controller updates the current device matching information based on the update information to form a control loop based on the device matching information.

Here, the manner in which the second controller updates the current device matching information based on the update information to form a control loop based on the device matching information includes, but not limited to, any one of the following:

1) when the update information includes updated device matching information, the second controller adopts the updated device matching information to replace its own current device matching information and forms a control loop based on the updated device matching information.

2) when the update information includes update indication information, the second controller performs an update operation to its own current device matching information based on the update indication information so as to obtain the updated device matching information and form a control loop based on the updated device matching information.

Continue illustration of the above first example. The update information received by the second controller C1 in step S23 includes the update indication information "replacing the pairing of Sen 1 and Act 1 with the pairing of Sen 1 and Act 2," and control loop information "Sen1-CL-C2-Act2" corresponding to the pair of Sen 1 and Act 2, then the second controller C1 modifies its own current device matching information based on the update indication information; similarly, the second controller C2 performs a corresponding operation to update the pairing information in its own device matching information; besides, the second controller C1 and C2 controls corresponding line switches based on the control loop information "Sen1-CL-C2-Act2" corresponding to the pair of Sen 1 and Act 2 as included in the update information, respectively, so as to implement the control loop.

According to the method of the present invention: the first controller may promptly know access and exit of each device in the network and correspondingly adjust each control loop, such that the networked control system has a higher flexibility and can better handle the current dynamic network topological structure; additionally, since it can provide a new control loop when fault occurs to a device so as to perform an approximate function, the whole networked control system has a higher error-allowance performance.

Figure 3:
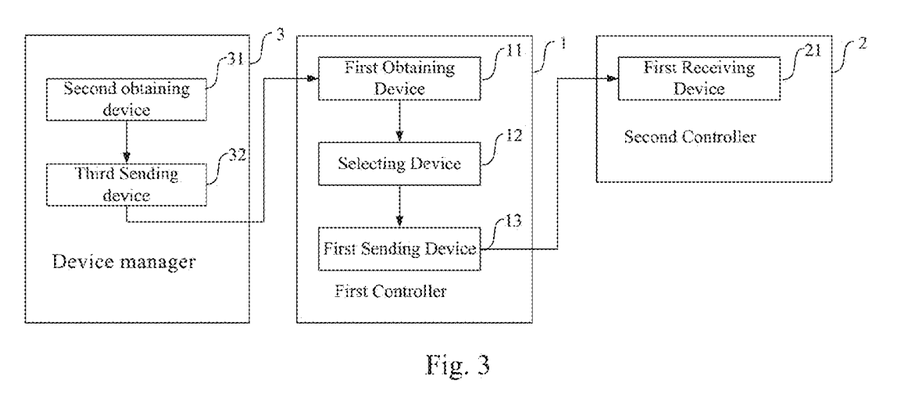
FIG. 3 schematically shows an apparatus diagram of a system for matching identification according to the present invention.

FIG. 3 schematically shows an apparatus diagram of a system for match identification according to the present invention. In FIG. 3, the hierarchical networked control system according to the present invention comprises a device manager 3, at least one first controller 1, and at least one second controller 2. Here, the device manager 3 comprises a second obtaining module 31, and a third sending module 32, the first controller 1 comprises a first obtaining module 11, a selecting module 12, and a first sending module 13, and the second controller 2 comprises a first receiving module 21.

With reference to FIG. 3, the second obtaining module 31 obtains device-related information of each device. Here, the said each device comprises at least one first device and at least one second device.

Specifically, the second obtaining module 31 obtains device-related information from each device based on an information transmission interface corresponding to a predetermined protocol.

Here, the device-related information includes, but not limited to, at least any one of the following:

1) device function information, e.g., sensors may be categorized into types of sensing temperature, sensing illumination intensity, sensing humid according to the information type received by the devices; for another example, the actuators may be categorized into operations for alarm, for enhancing sensor signals, and for weakening sensor signals, etc., according to the types of the operations performed by the devices.

2) device location information: preferably, the device location information includes relative location information with respect to other device, e.g., distance information with respect to other device, etc.

3) device performance information, e.g., remaining power information of the device, load information of the device, etc.

According to a first example of the present invention, with reference to FIG. 1, the hierarchical networked control system according to the present invention comprises a first controller CL, a device manager DM, two second controllers C1 and C2 belonging to wireless sensing and actuation networks WSAN-1 and WSAN-2, respectively, wherein WSAN_1 includes two sensors Sen 1 and Sen 2 and one actuator Act1, the WSAN_2 includes two sensors Sen 3 and Sen 4 and two actuators Act 2 and Act 3. Here, the second obtaining module 31 of the device manager DM is connected to each sensor and actuator through the second controllers C1 and C2 based on a predetermined OMA DM protocol, and obtains device-related information of the sensors Sen 1-Sen 4 and actuators Act 1 to Act 3 through a predetermined data transmitting interface defined by the OMA DM protocol.

Next, the third sending module 32 sends the obtained device-related information of the each device to the first controller.

Preferably, according to the scheme of the present invention, the device manager 3 further comprises a third updating module (not shown).

When a predetermined update condition is satisfied, the third updating module updates the obtained device-related information.

Here, the predetermined update condition includes, but not limited to, at least any one of the following:

1) predetermined time condition: for example, performing update upon arrival at a predetermined time point; for another example, performing the update operation with a predetermined internal from the last update operation.

2) predetermined event condition: i.e., when a predetermined event occurs, update the obtained device-related information. For example, when it is predetermined to receive fault report information from a device, perform the update; for another example, when detect a fault to a device based on heartbeat detection.

Specifically, the manner for the third updating module to obtain the update information is identical or similar to the manner of obtaining the device related-information for the second obtaining module 31, which will not be detailed here.

More preferably, the third sending module 32 performs operation after the third updating module so as to send the updated device related-information to the first controller.

Next, the first obtaining module 11 obtains device-related information corresponding to a plurality of devices from the device manager.

Specifically, the manner for the first obtaining module 11 to obtain device-related information corresponding to a plurality of devices from the device manager includes, but not limited to, any one of the following:

1) voluntarily sending inquiry information to the device manager so as to obtain the device-related information as fed back from the device manager;

2) receiving the device-related information sent by the device manager.

Next, the first selecting module 12 selects, each first device, a second device matching the said each first device from among the said at least one second device based on device-related information of the each device.

Specifically, the selecting module 12 obtains matching information each first device and each second device according to a predetermined matching rule, and determines second device(s) that best matches each first device based on the matching information.

Here, the matching information includes, but not limited to, any one of the following forms:

1) matching value, e.g., calculate a value of a matching degrees between the first device and the second device based on the device-related information in accordance with a predetermined matching rule, and select second device(s) with the highest matching degrees for the first device based on the matching value.

2) matching level, e.g., calculate a matching level between the first device and the second device based on the device-related information in accordance with a predetermined matching rule, and select second device(s) with the highest matching degrees for the first device based on the matching level.

Here, those skilled in the art may determine the predetermined matching rule for determining the matching information between the first device and the second device according to the actual condition and need, which will not be detailed here.

Continue illustration of the above first example. The selecting module 12 of the first controller CL determines an actuator that has a highest function matching degrees, a nearest distance, and a best current performance for each sensor based on the device-related information of each sensor Sen 1-Sen 4 and actuator Act 1-Act 3 in accordance with a predetermined matching rule, and obtains the matching degrees between each sensor and each actuator, as shown in Table 2 below.

TABLE 2

| Sensors | Actuators | Matching degrees |
|---------|-----------|------------------|
| Sen1    | Act1      | 1                |
|         | Act2      | 0.9              |
|         | Act3      | 0                |
| Sen2    | Act1      | 0.55             |
|         | Act2      | 0.6              |
|         | Act3      | 0                |
| Sen3    | Act1      | 0                |
|         | Act2      | 0                |
|         | Act3      | 1                |

TABLE 2-continued

| Sensors | Actuators | Matching degrees |
|---------|-----------|------------------|
| Sen4    | Act1      | 0                |
|         | Act2      | 0                |
|         | Act3      | 0                |

Next, the first sending module 13 determines corresponding device matching information based on the second device(s) matching the each first device, and sends the said device matching information to the at least one second controller.

Here, the device matching information comprises one or more pairs of matching first device and second device.

Specifically, the first sending module 13 sends the information about the second device(s) determined by the selecting module 12 that best matches each first device as the device matching information to at least one second controller that is connected to the first controller.

Preferably, the first sending module 13 further comprises a determining module (not shown) and a sub-sending module (not shown).

The determining module determines control loops between each first device and each second device that mutually matching based on line configuration information of each device and the selected second device(s) matching each first device.

Here, the line configuration information includes, but not limited to, line connection configuration for each device to receive data and line connection configuration for the devices to upload data.

Specifically, the determining module determines control loops between each paired first device and second device based on the line configuration information of each device and the determined paired information of each first device and second device.

Continue illustration of the above first example. The determining module determines that Sen 1 and Act 1, and Sen 3 and Act 3 are two groups of devices with a highest mutual matching degree based on the matching results obtained by the selecting module 12 as shown in Table 2, and the determining module determines that the control loop corresponding to the pair of Sen 1 and Act 1 is "Sen 1-CL-Act 1," the control loop corresponding to the pair of Sen 3 and Act 3 is "Sen 3-C2-Act 2," and sends the information about the two determined pairs and their corresponding control loops as the device matching information to the second controller C1 and the second controller C2.

Next, the sub-sending module sends the information about the selected second device(s) matching each first device and the determined control loops between the each first device and each second device that mutually matching as the device matching information to the second controller.

Next, the first receiving module 21 receives the device matching information from the first controller to form a control loops based on the device matching information.

Preferably, the device matching information includes information about the control loops corresponding to each pair of devices.

Here, the first receiving module 21 determines a closed state of each line switch under its control based on the received information about the control loop, so as to form control loops between each first device and each second device that mutually matching in the device matching information.

Continue illustration of the above first example. The first receiving module 21 of the second controller C1, after receiving the device matching information from the first controller CL, determines to connect the lines of Sen 1 and Act 1 via the second controller C1 based on the control loop information corresponding to the pair of Sen 1 and Act 1 in the device matching information, to form a control loop Sen 1-C1-Act 1; correspondingly, the second controller C2, after receiving the device matching information sent from the first controller CL, determines to connect the lines of Sen 3 and Act 3 via the second controller C2 according to the control loop information corresponding to the pair of Sen 3 and Act 3, to form a control loop Sen 3-C2-Act 3.

Preferably, according to one preferred embodiment of the present invention, the first controller 1 according to the present invention further comprises a first updating module (not shown) and a second sending module (not shown).

When a predetermined trigger condition is satisfied, the first updating module updates the device matching information.

Here, the predetermined trigger condition includes, but not limited to, at least any one of the following:

1) predetermined time trigger condition, for example, trigger at predetermined time point; for another example, trigger at each predetermined time period, etc.;

2) predetermined event trigger, for example, when receiving the information fed back by the second controller, trigger the update operation; for another example, when receiving a prompt from the device manager that the device-related information changes, trigger the update operation.

Specifically, the manner in which the first updating module updates the device matching information includes, but not limited to, any one of the following:

1) determining new device matching information through repetitively performing operation by the first obtaining module 11 and the selecting module 12.

2) when the first controller has saved the matching information between each device as obtained by the selecting module 12, updating the device matching information based on the saved matching information.

Next, the second sending module sends update information to the at least one second controller based on the updated device matching relationship, the update information being used for indicating each second controller to update the device matching information of their own.

Here, the update information includes any one of the following:

1) updated device matching information;

2) update indication information, e.g., the update indication information comprises: changing a pair in the current device matching information into information of another pair, etc.

Preferably, according to the manner of the present embodiment, the predetermined update trigger condition includes receiving device fault information from the second controller, the device fault information being used for indicating fault of one or more devices, wherein the second controller 2 further comprises a fault sending module (not shown), a second receiving module (not shown), and s a second updating module (not shown).

When the second controller detects fault of one or more devices, the fault sending module sends device fault information to the first controller. Here, the device fault information is used for indicating that one or more devices fail.

Preferably, the device fault information includes device identification information for identifying a device.

Continue illustration of the above first example. When fault sending module of the second controller C1 detects fault of the actuator Act 1, it sends device identification information of the actuator Act 1 to the first controller, so as to prompt the first controller that the actuator Act 1 has a fault.

Next, the first updating module of the first controller updates the device matching information based on the device fault information.

Specifically, the first updating module determines, based on a device corresponding to the device fault information, another device matching the device according to the current device matching information, and re-determines an other device matching the another device so as to update the device matching information. Here, when the another device is the first device, the other device is the second device; vice versa, when the another device is the second device, the other device is the first device.

Here, suppose the another device is the first device, then the manner of re-determining the other second device matching the first device includes, but not limited to any one of the following:

1) according to the device-related information of the first device, compare with the device-related information of every other available second device to obtain a second device matching the first device, thereby updating the device matching information;

2) when the first controller has saved the matching information between the first device and every other second device as obtained by the selecting module 2, selecting a second device best matching the first device from among every second device currently available based on the matching information so as to update the device matching information.

Preferably, when the device matching information further includes information about control loops of each paired devices, after determining a new device pair, the first updating module further determines a control loop corresponding to the new device pair so as to obtain the updated device matching information.

Continue illustration of the above first example. When the first controller CL receives the device fault information including the device identification information of Act 1 from the second controller C1, the first updating module of the first controller CL determines that the sensor matching Act 1 is Sen 1 based on the current device matching information; next, the first controller determines, based on the matching degrees between Sent and every other actuator as obtained by the selecting module 12, that the actuator that best matches the sensor Sen 1 from among the available actuators is the actuator Act 2, and determines that the current new device matching information includes pairing of Sen 1 and Act 2, and pairing of Sen 3 and Act 3; moreover, the first controller CL determines, based on the line configuration information between Sen 1 and Act 2, that Sen 1 and Act 2 may be connected through the first controller CL and the second controller C2.

Next, the second sending module of the first controller 1 sends the update information to the second controller.

Next, the second receiving module receives the update information from the first controller.

Next, the second updating module updates the current device matching information based on the update information to form a control loop based on the device matching information.

Here, the manner in which the second updating module updates the current device matching information based on the update information to form a control loop based on the device matching information includes, but not limited to, any one of the following:

1) when the update information includes updated device matching information, the second updating module adopts the updated device matching information to replace its own current device matching information and forms a control loop based on the updated device matching information.

2) when the update information includes update indication information, the second updating module performs an update operation to its own current device matching information based on the update indication information so as to obtain the updated device matching information and form a control loop based on the updated device matching information.

Continue illustration of the above first example. The update information received by the second receiving module of the second controller C1 includes the update indication information "replacing the pairing of Sen 1 and Act 1 with the pairing of Sen 1 and Act 2," and control loop information "Sen 1-CL-C2-Act2" corresponding to the pair of Sen 1 and Act 2, then the second updating module of the second controller C1 modifies its own current device matching information based on the update indication information; similarly, the second updating module of the second controller C2 performs a corresponding operation to update the pairing information in its own device matching information; besides, the second updating module of the second controller C1 and C2 controls corresponding line switches based on the control loop information "Sen1-CL-C2-Act2" corresponding to the pair of Sen 1 and Act 2 as included in the update information, respectively, so as to implement the control loop.

According to the scheme of the present invention: the first controller may promptly know access and exit of each device in the network and correspondingly adjust each control loop, such that the networked control system has a higher flexibility and can better handle the current dynamic network topological structure; additionally, since it can provide a new control loop when fault occurs to a device so as to perform an approximate function, the whole networked control system has a higher error-allowance performance.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims, instead of the above depiction. Thus, all variations intended to fall into the meaning and scope of equivalent elements of the claims should be covered within the present invention. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

What is claimed is:

1. A method implemented in a hierarchical network control system, the hierarchical network control system comprising a first controller for matching devices, at least one second controller for determining a control loop, wherein the at least one wireless sensing and actuation controller belongs to a respective at least one wireless sensing and actuation network, and a device manager, wherein the said first controller is connected to the device manager and the at least one second controller, wherein said method comprises:

obtaining, by the first controller, device-related information corresponding to a plurality of devices from the said device manager, wherein the plurality of devices comprise at least one first device and at least one second device;

selecting, by the first controller, for each first device, a second device matching the each first device from among the at least one second device based on device-related information of the each device;

determining, by the first controller, corresponding device matching information based on the second devices matching the each first device;

sending, by the first controller, the corresponding device matching information to the at least one second controller; wherein the device matching information comprises one or more pairs of matching first device and second device;

receiving, by the at least one second controller, device matching information from the first controller to form the control loop based on the device matching information;

when a predetermined trigger condition is satisfied, updating, by the first controller, the device matching information; and sending, by the first controller, update information to the at least one second controller based on the updated device matching relationship, the update information indicating for each second controller to update the device matching information of the second controller.

2. The method according to claim 1, wherein
the device-related information further includes line configuration information of the devices,
the determining the corresponding device matching information further includes determining, by the first controller, control loops between each first device and each second device that mutually matching based on line configuration information of each device and the selected second devices matching each first device and
the sending the corresponding device matching information includes sending, by the first controller, the information about the selected second devices matching each first device and the determined control loops between the each first device and each second device that mutually matching as the device matching information to the second controller.

3. The method according to claim 1, wherein the method comprises:

when it is detected that one or more devices fail, sending, by the at least one second controller, device fault information to the said first controller, wherein the device fault information is used for indicating that one or more devices fail;

receiving, by the at least one second controller, update information from the first controller; and updating, by the at least one second controller, current device matching information based on the update information to forma the control loop based on the device matching information.

4. The method of claim 1, the device manager being connected to the plurality of devices based on a predetermined protocol, the plurality of devices including at least one first device and at least one second device; the method further comprising:

obtaining, by the device manager, the device-related information of each of the plurality of devices; and sending, by the device manager, the device-related information of the each of the plurality of devices to the first controller.

5. The method according to claim 4, wherein the method further comprises:

when a predetermined update condition is satisfied, updating, by the device manager, the device-related information.

6. A hierarchical networked control system comprising:

a first controller connected to a device manager and at least one second controller, the first controller being configured to, obtain device-related information corresponding to a plurality of devices from the device manager, wherein the plurality of devices include at least one first device and at least one second device, select, for each first device, a second device matching the each first device from among the said at least one second device based on device-related information of the each device, to determine corresponding device matching information based on the second device matching the each first device, and send the device matching information to the at least one second controller; the device matching information including one or more pairs of matching first device and second device; and the at least one second controller belonging to a respective at least one wireless signing and actuation network, the at least one second controller configured to, when a predetermined trigger condition is satisfied, update the device matching information, and send update information to the at least one second controller based on the updated device matching relationship, the update information being used for indicating to each second controller to update the device matching information of the second controller.

7. The hierarchical networked control system according to claim 6, wherein the device-related information further includes line configuration information of the devices, and the first controller is further configured to, determine the corresponding device matching information determining control loops between each first device and each second device that mutually match based on line configuration information of each device and the second devices matching each first device, and send the corresponding device matching information by send the information about the second devices matching each first device and the control loops between each first device and each second device that mutually matching as the device matching information to the second controller.

8. The hierarchical networked control system according to claim 6, wherein the second controller further configured to, when it is detected that one or more devices fail, send device fault information to the first controller, wherein the device fault information is used for indicating that one or more devices fail;

receive update information from the first controller, and update current device matching information based on the update information to form a control loop based on the device matching information.

9. The hierarchical networked control system of claim 6 further comprising:

the device manager connected to the plurality of devices based on a predetermined protocol, the plurality of devices including at least one first device and at least one second device; the device manager being configured to, obtain the device-related information of each of the plurality of device, and send the device-related information of the each of the plurality of devices to the first controller.

10. The hierarchical networked control system according to claim 9, wherein the device manager is further configured to:

when a predetermined update condition is satisfied, update the device-related information.

* * * * *